United States Patent [19]

Morita

[11] Patent Number: 4,930,029
[45] Date of Patent: May 29, 1990

[54] MAGNETIC DISK APPARATUS

[75] Inventor: Isao Morita, Akishima, Japan

[73] Assignee: Kabushiki Kaisha Toshiba, Kanagawa, Japan

[21] Appl. No.: 216,582

[22] Filed: Jul. 8, 1988

[30] Foreign Application Priority Data

Jul. 10, 1987 [JP] Japan .............. 62-106017[U]

[51] Int. Cl.⁵ .................................. G11B 5/012
[52] U.S. Cl. ..................... 360/97.01; 360/98.01
[58] Field of Search ............ 360/106, 97.01, 98.01

[56] References Cited

U.S. PATENT DOCUMENTS 4,707,753 11/1987 Friehauf .................. 360/106
4,740,851 4/1988 Jones .................. 360/106 X Primary Examiner—A. J. Heinz
Attorney, Agent, or Firm—Finnegan, Henderson, Farabow, Garrett and Dunner

[57] ABSTRACT

The present invention resides in an arrangement structure of an electric portion, a mechanical portion, a base and a cover. A concave portion corresponding to the mechanical portion is formed in the base. On the upper side of the base the mechanical portion is arranged and is covered with a cover. On the under side of the base the electrical parts are arranged and the tailer electrical parts equipped on the printed wired board and are arranged in the concave portion of the base.

5 Claims, 3 Drawing Sheets

MAGNETIC DISK APPARATUS

The present application claims priority of Japanese Utility Model Application No. 62-106017 filed on July 10, 1987.

FIELD OF THE INVENTION AND RELATED ART STATEMENT

The present invention relates to a magnetic disk apparatus and more particularly to an improved and thinner construction of a magnetic disk apparatus.

The magnetic disk apparatus has been used as the external memory means for a computer and a word-processor.

Sofar, in such a magnetic disk apparatus, there is arranged a mechanical portion including a spindle motor equipped with a magnetic disk and a carriage having the magnetic head on a die-cast base and the mechanical portion is sealed up with a cover. On the under side of the base, there is arranged a circuit board equipped with electrical parts for the input/output of the various signals and for the various controls.

The foregoing used in the magnetic disk apparatus is formed by using a model shaped to the mechanical portion in accordance with the die-cast method.

Although the die-cast base of the magnetic disk apparatus may be easily formed even if it is of a complicated shape, it is difficult to thin the thickness. Furthermore, a blowhole is formed on the surface of the die-cast base there, requiring a complexed surface treatment.

In another conventional magnetic disk apparatus, the base is made of a plate material such as a metal plate to thin the base thickness. In such apparatus, the mechanical portion is mounted on the base and is covered with a cover for sealing up. On the under side of the base, the circuit board is mounted.

According to this kind of convention magnetic disk apparatus, it is possible to thin the base thickness. However, since the base is made of a plate shape and the mechanical portion must be mounted on the upper side and the circuit board must be mounted on the under side, it requires relatively large space and has a difficulty in effectively thinning the whole apparatus thickness.

OBJECT AND SUMMARY OF THE INVENTION

An object of the present invention is, therefore, to provide a magnetic disk apparatus constructed to have a thinner dimension.

Another object of the present invention is to provide a magnetic disk apparatus capable of reducing the manufacturing cost and the sub-standard article rate.

A magnetic disk apparatus according to the present invention comprises a base having a mechanical portion with a magnetic disk assembly and a magnetic head assembly on an upper side thereof, a cover for covering the mechanical portion mounted on the upper side of the base, a printed wired board equipped with electrical parts and mounted on the under side of the base, wherein a concave portion corresponding to the outer shape of the mechanical portion is formed in the base, the mechanical portion being arranged in the concave portion, and taller electric parts to be equipped on the printed wired board are arranged in the space formed between the printed wired board and the base at the outer circumference of the concave portion.

The present invention uses the plate material as the base with the optimum plastic processing, thereby eliminating the finishing treatment after manufacturing and making it possible to provide the better reference side for assembling the mechanical portion. Moreover, in the present invention the taller electric parts are arranged in the space where only mechanical portions have been arranged in the conventional apparatus.

DETAILED DESCRIPTION OF PREFERRED EMBODIMENTS

The embodiments of the present invention are explained below with reference to the drawings.

Figure 1:
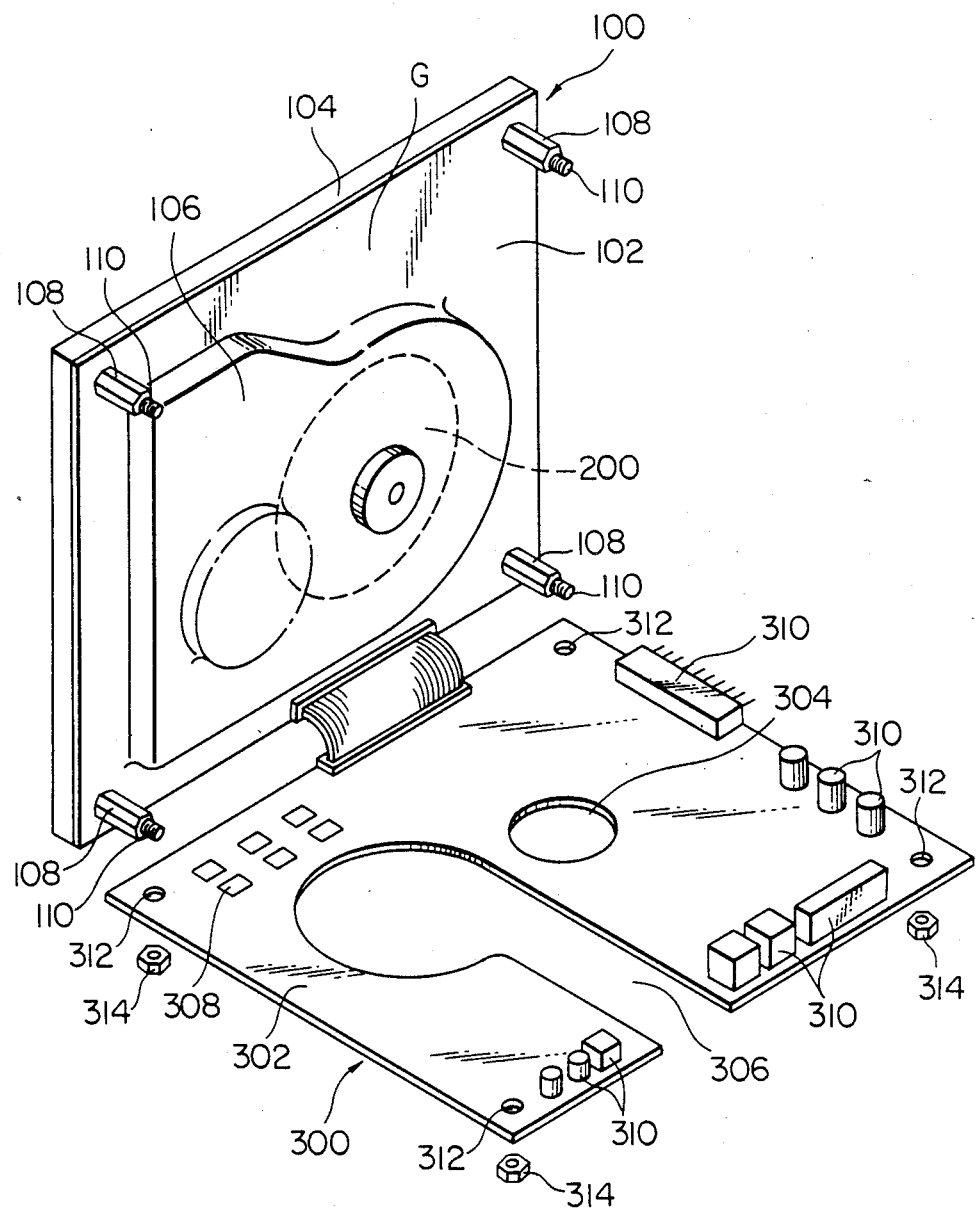
FIG. 1 is a decomposited squint view depicting a magnetic disk apparatus according the one embodiment of the present invention.
Figure 2:
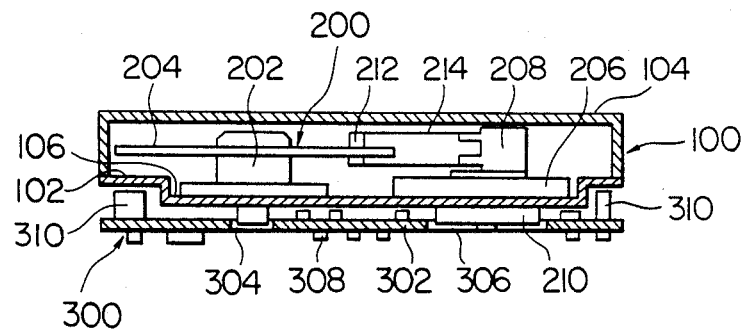
FIG. 2 is a side sectional view of the assembled magnetic disk apparatus of FIG. 1.
Figure 3:
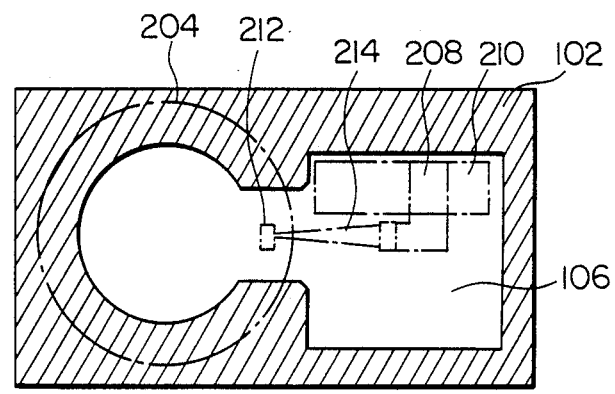
FIG. 3 is a sectional part plan view of the magnetic disk apparatus of FIG. 2.

FIG. 1 is a decomposited squint view of one embodiment according to the present invention. FIG. 2 is a side sectional view of the assembled magnetic disk apparatus of FIG. 1. FIG. 3 is a sectional part plan view of FIG. 2.

As shown in the drawings, the magnetic disk apparatus comprises a body portion 100, a mechanical portion 200 and a circuit board 300.

The body portion 100 includes a base plate 102 and a cover 104.

The base plate 102 (base), consisting of plate material such as a steel, an aluminum and an alloy, includes a concave portion 106 formed by plastic working such as shearing, bending, reducing of area and forging workings. Base 102 includes a first surface and an opposing second surface. The area of the concave portion will hereinafter be referred to as the first area and the remaining portions of the base will be referred to as the second area. The shape of the concave portion 106 is adapted to the shape of the mechanical portion 200. On the side of the base 102 where the concave portion 106 is formed, stopped bolts 108 are positioned at the four corners for forming the space. Screw portion 110 are formed at the tips of these stepped bolts 108.

In the concave portion 106 of the base 102, a spindle motor 202 of the mechanical portion 200 is arranged. To the spindle motor 202, a magnetic disk 204 as a recording medium is equipped. The magnetic disk 204 is rotationary driven by the spindle motor 202. A carriage 208 is installed through a carriage rail 206 in the concave portion 106. The carriage 208 is movable in the radial direction of the magnetic disk 204 by the carriage driving motor 210 mounted on the under side of the concave portion 106. To the tip of the carriage 208, a magnetic head 212 which records and reproduces the data for the magnetic disk 204 is mounted through an arm 214. The magnetic head may access to the respective tracks of the magnetic disk 204 through movement of the carriage 208 in the radial direction of the magnetic disk by the carriage driving motor 210.

A cover 104 is arranged on the base 102 to cover the mechanical portion.

A printed wired board 302 having a circuit board is mounted on the under side of the base 102. An insertion hole 304 and a cut portion 306 are formed in the printed wired board 302. The insertion hole 304 and the cut portion 306 correspond to the spindle motor 202 and the carriage driving motor 210 protruding from the under side of the base 102, respectively. Electrical parts 308 and 310 are disposed on the side of printed wire board 302 facing base 102, and the taller electrical parts 310 are arranged in a space G formed on the outer circumference side of the concave portion 106 of the base 102. At the four corners of the printed wired board 302 there are insertion holes 312 corresponding to the stepped bolts of the base 102.

The stepped bolts 108 are inserted through the insertion holes of the printed wired board 302 and are fastened by means of nuts 314.

As described above, according to this embodiment, the circuit board portion 300 is mounted on the under side of the base 102 and the taller electrical parts 310 equipped on the printed wired board 302 of the circuit board portion 300 are arranged in the space formed around the outer circumference of the concave portion 106, thereby making it possible to reduce the housing space for the circuit board portion 300 and thereby reduce the thickness of the entire magnetic disk apparatus.

Furthermore, if plate material issued for the base 102 and plastic working condition are optimized, a special finishing treatment is not necessary for the reference side of base 102 after manufacturing. Even if minimum machine manufacturing is performed, finishing is much easier compared to the finishing required for conventional die-case plates. Defects such as "blowholes," are unlikely to occur.

Therefore, according to this embodiment, the space in the apparatus may be effectively utilized and the thinning and miniaturizing the whole magnetic disk apparatus becomes possible. Moreover, the final finishing treatment process for the reference side of the base 102 may be eliminated or reduced. As a result, the sub-standard article rate and cost may be reduced.

Figure 4:
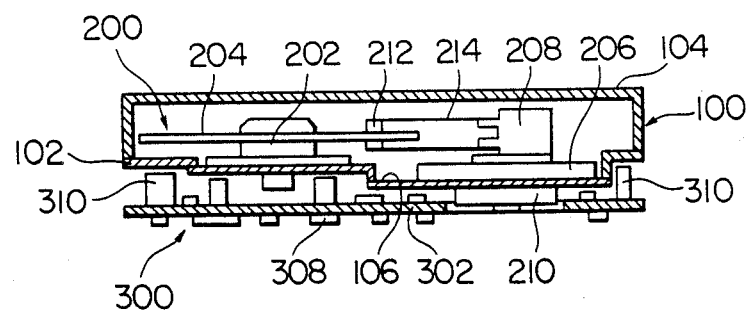
FIG. 4 is a side sectional view depicting the magnetic disk apparatus of a second embodiment of present invention.
Figure 5:
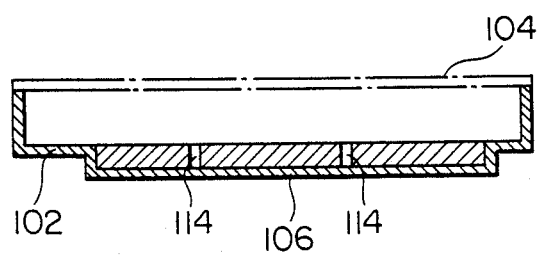
FIG. 5 is a side sectional view depicting the magnetic disk apparatus of the second embodiment of the present invention.

It is to be noted that more effective utilization of the space may be possible by forming the concave portion 106 of a plurality of stages such as three stages, as shown in FIG. 4. Furthermore, as shown in FIG. 5, the stiffness of the base 102 is improved by arranging a rib 114 at the appropriate position of the base 102. In FIGS. 4 and 5, common parts in FIGS. 1 through 3 are designated by the same numerals and the redundant description is omitted here.

What is claimed is:

1. A magnetic disk apparatus, comprising:
   a base plate having a first surface and a second surface opposite said first surface, said base plate having an indentation therein, said indentation being concave on said first surface and convex on said second surface, and defining an inset area on said second surface about the circumference of said indentation;
   a mechanical portion having a magnetic disk assembly and a magnetic head assembly mounted on said first surface in said indentation;
   a cover for covering at least said mechanical portion, said cover mounted on said first surface of said base plate;
   a printed circuit board having a plurality of taller and shorter electrical parts disposed thereon, said printed circuit board being mounted on said second surface of said base plate, said taller electrical parts being arranged to protrude into said inset area of said base plate.

2. A magnetic disk apparatus according to claim 1, wherein the base plate is made of metal.

3. A magnetic disk apparatus according to claim 1 further comprising stepped bolts extending between and connecting said base plate and said circuit board.

4. A magnetic disk apparatus according to claim 1, wherein said base plate is made of steel.

5. A magnetic disk apparatus according to claim 1, wherein said magnetic disk assembly includes a hard disk drive.

* * * * *